Patented Oct. 11, 1927.

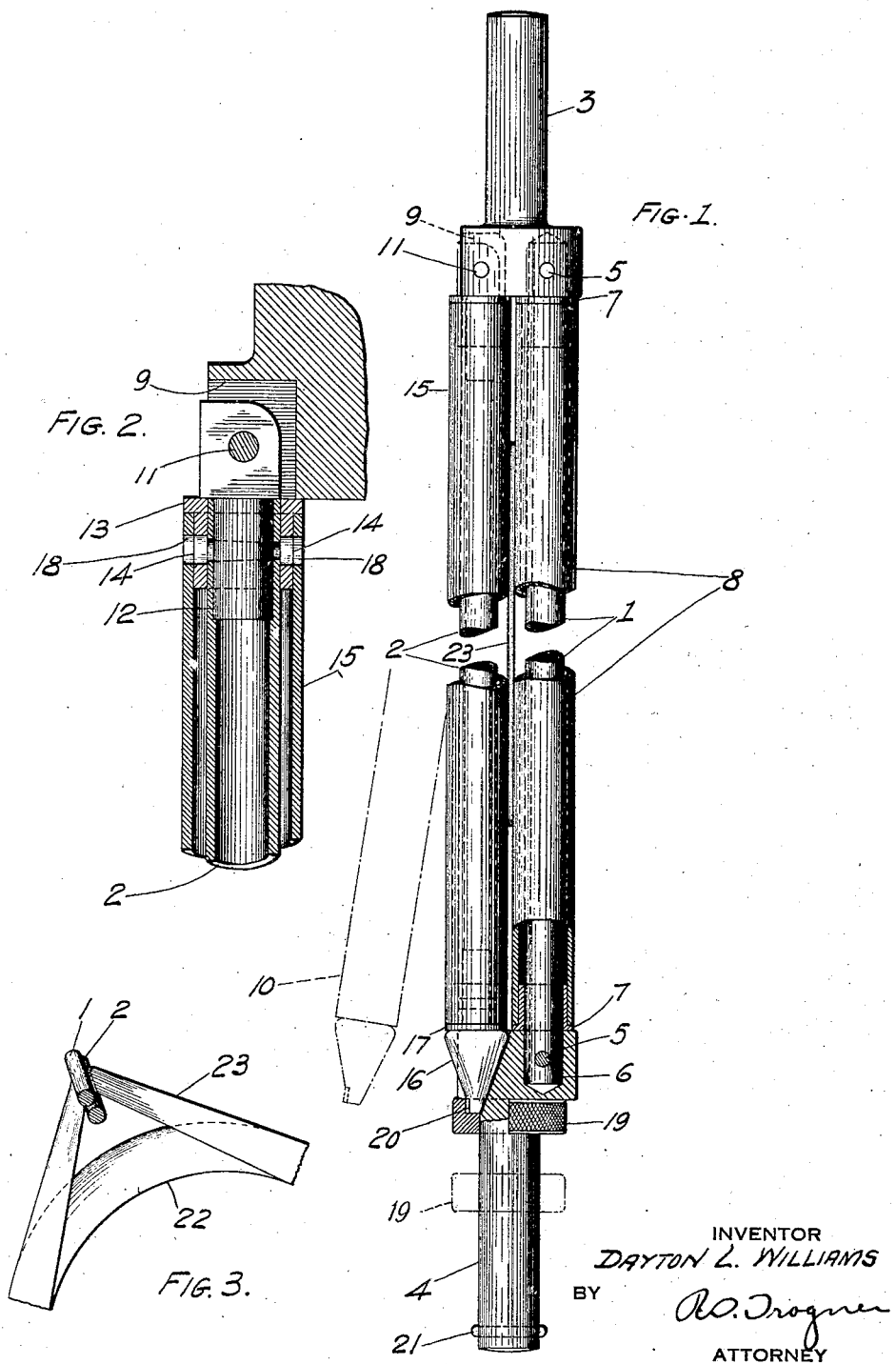

1,645,081

UNITED STATES PATENT OFFICE.

DAYTON L. WILLIAMS, OF AKRON, OHIO, ASSIGNOR TO THE GOODYEAR TIRE & RUBBER COMPANY, OF AKRON, OHIO, A CORPORATION OF OHIO.

TIRE-BUILDING TOOL.

Application filed November 8, 1924. Serial No. 748,644.

The present invention relates to tools adapted to be used for building pneumatic tire casings, and it has particular relation to tools of the character designated, which are peculiarly adapted for use in assembling endless bands of tire fabric for the purpose of building such tire casings.

One object of this invention is to provide a simple, inexpensive and efficient roller-bar mechanism adapted to facilitate the application of endless bands of fabric upon a rotatable core member.

Another object of my invention is to provide a roller bar mechanism which will prevent the wrinkling of the fabric band when it is applied to the core.

Other objects and advantages will be apparent from the following description of the device.

Heretofore, in constructing tires, it has been customary to apply endless bands upon a rotatable core by hand. In applying such endless bands to a rotatable core, the first band which engages the iron core is readily applied and positioned. The subsequent bands, however, are very difficult to apply by hand, on account of the fact that the band being applied, and those over which it is being placed, are both uncured and present adhesive contiguous surfaces. This difficulty is increased by the fact that the band is of such diameter that it cannot be placed loosely over the core, but must be placed thereon by first applying one edge of the band and gradually working it to a central position. This necessitates breaking loose all contacts formed during the process of application until the band is finally centered on the core. If these contacts are broken by hand, the edges of the band are necessarily strained and pulled out of shape. Also, the band is invariably wrinkled in applying it by this method.

By my invention these difficulties have been obviated, and I have provided a means for insuring the production of a tire of which no portions are strained and of which all portions are under equal tension.

The accompanying drawings which form a part of this application illustrate one embodiment of my invention in which:

Fig. 1 is a side elevational view of a device constructed in accordance with my invention, portions being broken away for the sake of clearness.

Fig. 2 is a sectional view, on a larger scale, showing in detail the construction of one of the roller members; and Fig. 3 is a fragmentary perspective view of a band being applied to a tire building form.

In the drawings I have shown a hollow rod 1 which is secured at each end to handle members 3 and 4 by means of pins 5. The rod 1 is in the form of a tubular bar and fits into recesses 6 of the handle members. Surrounding the rod 1 and supported in spaced relation thereto by means of bushings 7 is a tubular member 8, which is adapted to act as a roller.

Disposed in spaced parallel arrangement with the rod 1 is a second hollow rod 2, which is pivoted at one end in a slot 9 in the handle member 3 by means of a pin 11, as clearly shown in Fig. 2. The slot permits the rod 2 to swing outwardly from the rod 1 upon the pin 11, as indicated at 10 by the dot and dash outline of Fig. 1. The pivoted end of the rod 2 is provided with an enlarged portion 12, to which an annular bushing 13 is secured by means of a pin 14. Rotatably mounted on the bushing 13 is a roller member 15.

Upon the opposite end of the rod 2 is provided an enlarged portion 16 which prevents the roller member 15 from sliding out of position on the bar 2. This end of the bar 2 is also provided with a bushing 17 upon which the roller member 15 is mounted. The end of the roller member 15 adjacent the pivot pin 11 is provided with oppositely disposed openings 18 through which the pin 14 may be inserted in assembling the mechanism. The bar 2 and its associated roller member 15 are held in the proper position with respect to the roller member 8 by means of a collar 19. The collar slides on the shank of the handle and is provided with a cavity 20 of enlarged diameter which, when in position, fits over a projection 20 on the end of the member 17. A pin 21 is inserted through the lower end of the handle 4 for the purpose of preventing the collar 19 from sliding off the handle.

In Fig. 3 is shown a portion of a core 22, constituting a portion of a tire building machine, upon which an endless band 23 of tire fabric is being mounted.

In practising my invention, a portion of the edge of a band is placed in engagement with the rotatable core. The collar 19 is then moved outwardly on the handle 4, permitting the roller member 15 to be disposed within the endless band 23, after which the rollers are again brought into parallelism, with the fabric 23 disposed therebetween, in the manner illustrated in Fig. 1. The roller 15 is then secured in such operative position by moving the member 19 to its locking position. The operator then stands before the rotatable core, grasping the roller member by the handles 3 and 4. The core 22 is then caused to rotate, drawing the fabric band between the roller members. By suitable manipulation, chiefly by proper inclination of the roller bar, the band may be properly centered upon the core in a relatively short period of time, after which the roller mechanism is again opened, and the bar 15 removed from the band.

It will be apparent that by the use of my invention, the localization of stresses in the edges of the fabric band during the building operation, caused by hand operation, are obviated, all portions of the band are subjected to equal strains at all times, and the disposition of the two bars in parallel proximity to each other prevents any possibility of the fabric being wrinkled.

Although I have illustrated but one form which my invention may assume, and have described in detail but a single application thereof, it will be apparent to those skilled in the art that it is not so limited, but that various minor modifications and changes may be made therein without departing from the spirit of my invention or from the scope of the appended claims.

What I claim is:

1. A tire building tool comprising a rod, handles rigidly secured to the rod, and a member cooperating with the rod for confining flexible material between said rod and member.

2. A tire building tool comprising a rod having handles rigidly secured thereto and adapted to engage a movable endless band, and a pivoted member cooperating with the rod for releasably confining the band between the rod and member.

3. A hand tool for building tires comprising a rod adapted to engage a movable endless band, handles rigidly secured to the rod, a member cooperating with the rod to confine the band between the member and the rod, and means for holding such member in operative position with respect to the rod.

4. A hand tool for building tires comprising two rods adapted to confine a flexible band therebetween and a pair of oppositely disposed handles secured to one of the rods.

5. A hand tool for building tires comprising two rods adapted to confine a band of flexible material therebetween, a pair of oppositely disposed handles secured to one of the rods, and means for holding the rods in operative position with respect to each other while the band is confined therebetween.

6. A tire building tool comprising a rod provided at each end with a handle, a second rod pivotally secured at one end to one of said handles, and means for releasably securing the other end of the pivoted rod to the other handle.

7. A tire building tool comprising a rod provided at each end with a handle, a second rod pivotally secured at one end to one of the handles, a collar disposed on the other handle, the other end of the pivoted rod being releasably secured to said other handle by means of the collar, and a rotatable member mounted on each of the rods.

8. A hand tool for building tires comprising a pair of rotatable members, means including oppositely disposed handles for supporting the rotatable members, one of said members being pivotally movable toward and away from the other member, and means for releasably securing the rotatable members in contiguous relationship.

9. A device of the character described comprising two rods adapted to be normally disposed in parallel relationship, a relatively long member rotatably mounted on each of said rods, handles for supporting the adjacent ends of the rods, one handle having a recess therein, one end of one of the rods being pivotally secured to one of the handles and the other end being releasably secured in the recess in the other handle, and a slidable collar mounted on the recessed handle being adapted to lock the rod end in the recess.

10. A hand tool for building tires comprising two relatively long substantially straight rotatable members normally disposed in spaced parallel relation, means pivotally connecting said members and means operatively associated with both members for locking them in parallel relation.

11. A hand tool for building tires comprising a supporting structure, including oppositely disposed handles, a rotatable member mounted between the handles and adapted to engage a relatively movable band of flexible material, means mounted on the structure in contiguous relation to the rotatable member being adapted to prevent wrinkling of the band while the latter engages the rotatable member.

October 30, 1924.

In witness whereof, I have hereunto signed my name.

DAYTON L. WILLIAMS.